United States Patent Office 3,038,905
Patented June 12, 1962

3,038,905
1,1-DICYCLOHEXYL-2-(2-PIPERIDYL)ETHYLENE
Frank P. Palopoli and William L. Kuhn, Cincinnati, Ohio, assignors to Richardson-Merrell Inc., a corporation of Delaware
No Drawing. Filed May 24, 1960, Ser. No. 31,254
1 Claim. (Cl. 260—293)

This invention relates to the new chemical compound 1,1-dicycyohexyl-2-(2-piperidyl)ethylene.

The novel compound has the formula

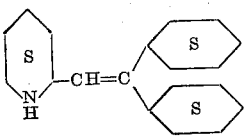

in which S signifies that the ring is saturated.

The compound can be prepared as the free base or as an acid addition salt. The compound can be prepared by the dehydration of the corresponding piperidine ethanol or from the corresponding pyridine ethanol by first hydrogenating the pyridine ring and then dehydrating. The dehydration step can be accomplished by any conventional dehydrating agent, such as phosphoric acid (85%), alcoholic hydrogen chloride, or toluene sulfonic acid. The hydrogenation of the pyridine ring of the intermediate is accomplished by standard hydrogenation procedures.

This new compound is physiologically active as a coronary dilator and is useful in the treatment of cardiac diseases where increased blood flow to the myocardium is required. It is especially useful in the treatment of angina pectoris, both prophylactically and to reduce the requirement for nitro-glycerin in acute attacks. It has relatively less effect on peripheral blood pressure than some other coronary dilators, for instance nitro-glycerin.

The new compound of the present invention is effective orally and may be administered in any convenient dosage unit form at the rate of 100 mg. to 2000 mg. per day as directed by the attending physician in view of the condition of the patient and the severity of the disease to be treated. The compound is effective in the form of its free base or as acid addition salts and may be administered in tablets, capsules, syrups, suspensions, or in other convenient dosage unit forms.

EXAMPLE 1,1-Dicyclohexyl-2-(2-Pyridyl)Ethanol

An ethereal solution of 61.3 grams of bromobenzene was added slowly to a suspension of 5.4 grams of lithium chips in 125 ml. of ether. After all the lithium had reacted, the solution of phenyl-lithium was added to 35 grams of α-picoline in 200 ml. of ether and the solution stirred for one hour. To this solution was then added, in one hour, 67.5 grams of dicyclohexyl ketone in 200 ml. of dry benzene. The reaction mixture was refluxed for four hours then decomposed with a saturated ammonium chloride solution. The ether layer, after drying over magnesium sulfate, was acidified with alcoholic hydrogen chloride. The product, 1,1-dicyclohexyl-2-(2-pyridyl)ethanol hydrochloride, was recrystallized from a mixture of ethyl acetate and ethanol to give 66 grams of a white solid, melting at 196–197° C.

1,1-Dicyclohexyl-2-(2-Piperidyl)Ethanol

An alcohol solution containing 20 grams of the hydrochloride salt of 1,1-dicyclohexyl-2-(2-pyridyl)ethanol was hydrogenated in the presence of platinum oxide at about 60 lbs. of hydrogen pressure. The catalyst was separated and the alcohol removed under reduced pressure. The product, 1,1-dicyclohexyl-2-(2-piperidyl)ethanol hydrochloride, crystallized from a mixture of ethyl acetate and ethanol as a white solid, melting at 260–261° C.

1,1-Dicyclohexyl-2-(2-Piperidyl)Ethylene

Fifteen grams of 1,1-dicyclohexyl-2-(2-piperidyl)ethanol hydrochloride was dehydrated with 25 ml. of 85 percent phosphoric acid at steam bath temperature. Two hundred ml. of water was added to the reaction mixture and the solution neutralized with a 10 percent sodium hydroxide solution. The free base was taken up in ether, dried over magnesium sulfate and the ether solution acidified with alcoholic hydrogen chloride. The product, 1,1-dicyclohexyl-2-(2-piperidyl)ethylene hydrochloride, crystallized from ethyl aceate, containing a trace of alcohol, as a white solid, melting at 152–154° C.

We claim:
1,1-dicyclohexyl-2-(2-piperidyl)ethylene.

References Cited in the file of this patent
UNITED STATES PATENTS 2,833,775  Sperber et al. _____ May 8, 1958

OTHER REFERENCES

Adamson et al.: Journal of the Chemical Society (1951), page 59.